United States Patent

Palko et al.

[11] Patent Number: 5,958,262
[45] Date of Patent: Sep. 28, 1999

[54] EQUALIZING MECHANISM FOR ROBOTICALLY CARRIED SPOT WELD GUNS

[75] Inventors: Michael Palko, Plymouth; James Wayne Dolfi, Livonia; Keith Albert Dils, Royal Oak., all of Mich.

[73] Assignee: Ford Global Technologies, Inc., Dearborn, Mich.

[21] Appl. No.: 09/233,234

[22] Filed: Jan. 19, 1999

[51] Int. Cl.⁶ .................................................. B23K 11/10
[52] U.S. Cl. ................................................ 219/89; 219/90
[58] Field of Search ........................... 219/89, 90, 86.25, 219/86.33

[56] References Cited

U.S. PATENT DOCUMENTS

| | | | |
|---|---|---|---|
| 4,825,031 | 4/1989 | Heidman | 219/89 |
| 5,157,234 | 10/1992 | Umeda | 219/89 |
| 5,705,783 | 1/1998 | Baustert | 219/89 |

Primary Examiner—Patrick Ryan
Assistant Examiner—Anjan Dey
Attorney, Agent, or Firm—Joseph W. Malleck

[57] ABSTRACT

A spot welding apparatus having a welding gun with movable and fixed electrodes carried on an articulating wrist, the apparatus comprising: a) a robotically actuated articulating wrist carrying the gun for movement to and from a welding position for a workpiece; b) a primary cylinder assembly connecting the wrist to the movable electrode of the gun for imposing pressure by such movable electrode to the workpiece and to the fixed electrode during a welding stroke toward the workpiece; and c) a fixing cylinder assembly connecting the wrist to the fixed electrode, the fixing cylinder assembly having (i) a fixing cylinder housing with a movable fixing piston therein connected to the fixed electrode of the welding gun and having a fixing piston stop, (ii) a primary balancing spring acting between the fixing cylinder housing and the movable fixing piston to carry the weight of the gun, (iii) structure for introducing a fixing air pressure into the fixing cylinder housing to urge the fixing piston to a position locked against the fixing piston stop, and (iv) a secondary modulating device acting between the fixed electrode of the gun and the fixing cylinder housing to dampen vibratory movement of the gun upon release of the fixing air pressure for initiation of the welding stroke.

10 Claims, 4 Drawing Sheets

EQUALIZING MECHANISM FOR ROBOTICALLY CARRIED SPOT WELD GUNS

FIELD OF THE INVENTION

This invention relates to the technology of supporting spring balanced spot welding guns on robotic arms that impose momentum on the welding guns when moved into a welding position prior to initiating the welding stroke, and more particularly to the technology for eliminating damage to the weldable workpieces due to wobble or vibration resulting from such momentum of the spring balanced guns.

DESCRIPTION OF THE PRIOR ART

The state of the art for spot weld guns usually requires a fixed electrode and a movable electrode that is pneumatically brought toward the fixed electrode during the weld stroke, but only after the electrodes are positioned in close proximity to the weldable workpiece. During robot positioning, the weight of the electrodes and their support are carried on a locked air cylinder device that keeps the electrodes in an open or spaced apart relationship for such positioning. Upon completion of the positioning movement, air pressure in the cylinder is released, allowing a fixing spring to support the electrode just prior to and during the welding stroke. Momentum from the rapid robotic positioning movement or momentum from actuation of the air cylinder, may cause the fixed electrode to vibrate against the fixing spring. Such vibration or wobble may cause the fixed electrode to contact the workpiece and dent it or result in defective spot welds because of improper dimensioning during spot welding pressure application.

SUMMARY OF THE INVENTION

It is an object of this invention to overcome the problems recited above. To this end, the invention is a spot welding apparatus having a welding gun with movable and fixed electrodes carried on an articulating wrist, the apparatus comprising: a) a robotically actuated articulating wrist carrying the gun for movement to and from a welding position for a workpiece; b) a primary cylinder assembly connecting the wrist to the movable electrode of the gun for imposing pressure by such movable electrode to the workpiece and to the fixed electrode during a welding stroke toward the workpiece; and c) a fixing cylinder assembly connecting the wrist to the fixed electrode, the fixing cylinder assembly having (i) a fixing cylinder housing with a movable fixing piston therein connected to the fixed electrode of the welding gun and having a fixing piston stop, (ii) a primary balancing spring acting between the fixing cylinder housing and the movable fixing piston to carry the weight of the gun, (iii) structure for introducing a fixing air pressure into the fixing cylinder housing to urge the fixing piston to a position locked against the fixing piston stop, and (iv) a secondary modulating device acting between the fixed electrode of the gun and the fixing cylinder housing to dampen vibratory movement of the gun upon release of the fixing air pressure for initiation of the welding stroke.

DETAILED DESCRIPTION AND BEST MODE

Figure 1:
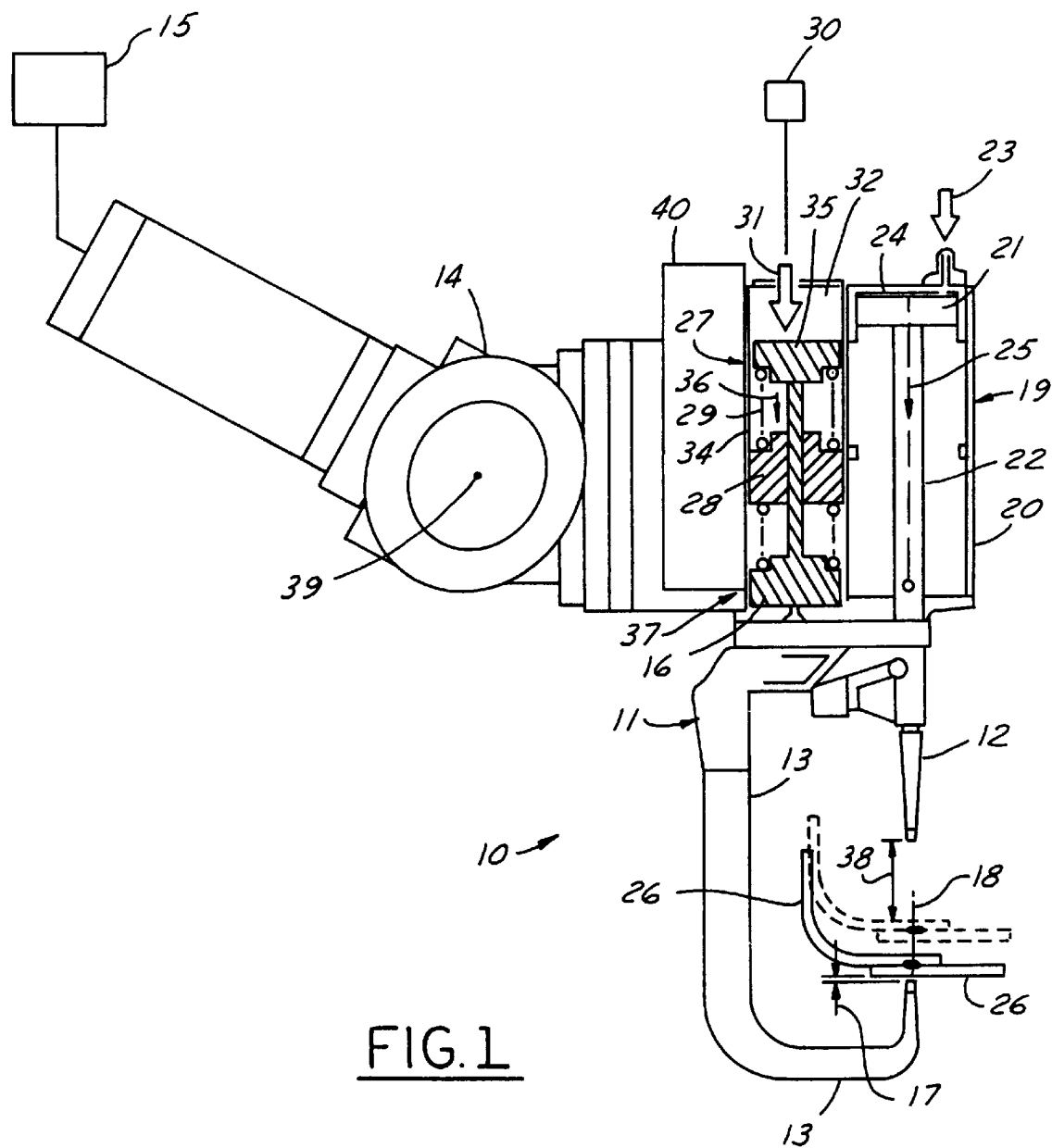
FIG. 1 is a schematic elevational view, partly in section, of a spot welding apparatus illustrating the principles of this invention as applied to a C-type spot welding gun.

As shown in FIG. 1, the spot welding apparatus 10 has welding gun 11 (provided with a movable electrode 12 relative to the gun and a fixed electrode 13 relative to the gun) carried on an articulating wrist 14 of a robot 15. The robot rapidly swings the wrist and gun into position adjacent a weldable workpiece 26, such as an automotive body frame or panel, such positioning usually requiring the fixed electrode to be positioned within a predetermined distance 8 from the desired spot weld location 17, such as in the dimensional range of 5–15 mm.

A primary cylinder assembly 19 connects the wrist 14 with the movable electrode 12. Assembly 19 comprises a cylinder housing 20 and a primary piston 21 having a rod 22 extending sealingly through the housing to connect with electrode 12. Primary fluid pressure 23 is applied to the primary housing chamber 24 to force the piston 21 in the direction 25 illustrated to engage a workpiece 26 and create a clamped assembly of the workpiece and the two electrodes. The movable electrode applies sufficient pressure to effect a spot weld in accordance with normal spot welding requirements.

A fixing cylinder assembly 27 connects the wrist 14 to the fixed electrode 13. The fixing cylinder assembly 27 has a fixing cylinder housing 34 provided with a movable fixing piston 35 therein connected to the fixed electrode 13 of the welding gun 11 and having a fixing piston stop 28.

The assembly 27 further comprises a primary balancing spring 29 acting between the stop 28 (of the fixing cylinder housing 34) and the movable fixing piston 35 to carry the weight of the gun during a welding stroke 38.

The assembly 27 also has a structure or means 30 for introducing a fixing air pressure 31 into the fixing cylinder housing chamber 32 to urge the fixing piston 35 in direction 36 to a position (shown in FIG. 1) as locked against the fixing piston stop 28.

The assembly 27 finally comprises a secondary modulating device 37 acting between the fixed electrode 13 of the gun 11 and stop 16 (of the fixing cylinder housing 34) to dampen vibratory movement of the gun 11 upon release of the fixing air pressure 31 for initiation of the welding stroke 38.

The wrist 14 may have several axes of rotation such as axis 39. Several electrical actuating air control devices (not shown) are associated with the introduction and venting of air to and from the chambers 24 and 32; such electrical devices may be powered by transformer 40.

Figure 2:
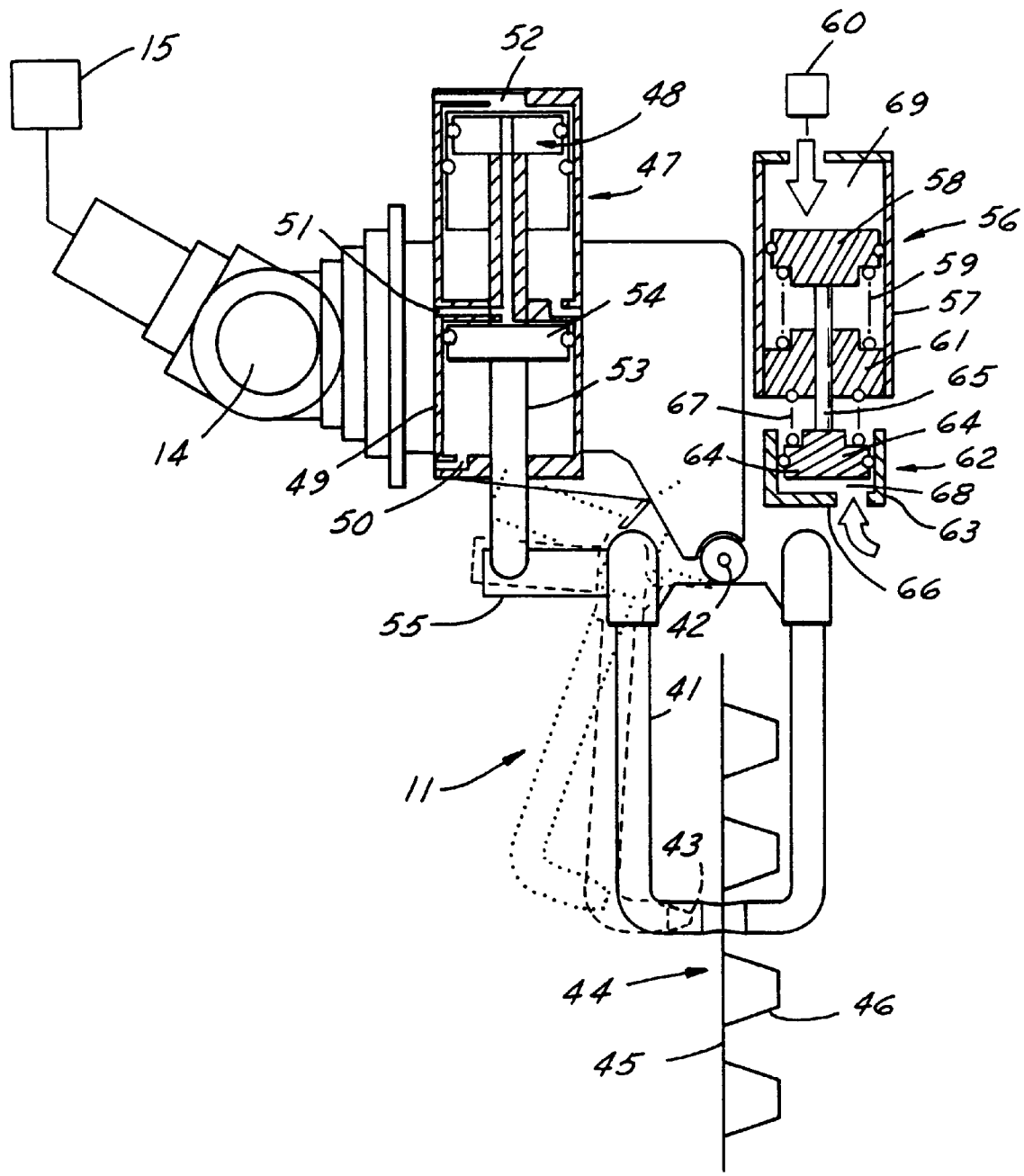
FIG. 2 is a schematic elevational view, partly in section, illustrating another way in which the principles of this invention can be applied to a pinch-type spot welding gun.

As shown in FIG. 2, the gun 11 may be of the "pinch" type, wherein a movable electrode 41 is pivoted about an axis 42 to allow the electrode tip 43 to apply pressure by swinging into contact with the workpiece 44, which here constitutes a flat metal sheet 45 and a corrugated metal sheet 46 for forming a panel. The primary cylinder assembly 47, carried by wrist 14 connected to a robot 15, has a spool piston 48, sealingly slidable in cylinder housing 49, actuated by differential pressures applied through several different ports 50, 51 and 52. A shaft 53, connected to piston portion 54 of the spool piston 48, is then made operable to selectively and linearly engage the end of a finger 55 of electrode 41 to swing it about axis 42 and apply pressure.

The embodiment of FIG. 2 is also distinguished by the fixing cylinder assembly 56, which not only has a fixing cylinder housing 57, a fixing piston 58, a primary balancing spring 59, an air pressurizing means 60, and a fixing stop 61, all of which operate in a manner similar to that of FIG. 1, but has a different secondary modulating device 62 that is connected to the fixed electrode of the gun. Such secondary modulating device 62 has a secondary modulating cylinder housing 63 provided with an air chamber 68 normally biasing the modulating piston 64 away from modulating piston stop 66. The modulating piston 64 is slidable within the cylinder housing 63 and is connected to fixing piston 58 by shaft 65. A modulating spring 67 acts between the modulating piston 64 and the fixing stop 61 or fixing cylinder housing 57 to urge the modulating piston 64 against the cushion of air that may be contained in chambers 68 between the modulating piston housing 63 and the modulating piston 64 to thereby dampen any vibratory movement of the gun 11 upon release of air pressure in the fixing cylinder housing chamber 69.

Due to the need to reduce spot welding cycle time, rapid and sudden robotic movement leaves momentum energy retained in the mass of the weld gun for an instant after completion of gun positioning and the concurrent initiation of the weld stroke. Such positioning will desirably place the fixed electrode within plus or minus 5 mm of the workpiece while the movable electrode begins its stroke of plus or minus 25 mm to make contact and apply pressure to the workpiece. Upon such initiation, air pressure is vented from the fixing cylinder chamber 32, 69 thereby placing the weight of the gun onto the primary balancing spring 29, 59. Such residual momentum will cause the gun to be unstable and has the potential to cause damage to the workpiece before settling down during the full weld stroke or may cause inaccurate placement of the spot weld. This invention overcomes such contingencies by use of the modulating spring 67 which has a spring force matched to the spring force of the primary balancing spring 59 to effect the desired modulation.

The force of the primary spring is advantageously in the range of 0–200 lbs. and the force of the secondary or modulating spring is desirably in the range of 0–100 lbs. Air pressure used to actuate the primary piston to a locked condition against the stop 61 is in the range of 60–100 psi, and the secondary air pressure is in the range of 40–100 psi, but can be adjusted to vary the net spring force applied to the support for the gun in a quiescent balanced manner.

Figure 3:
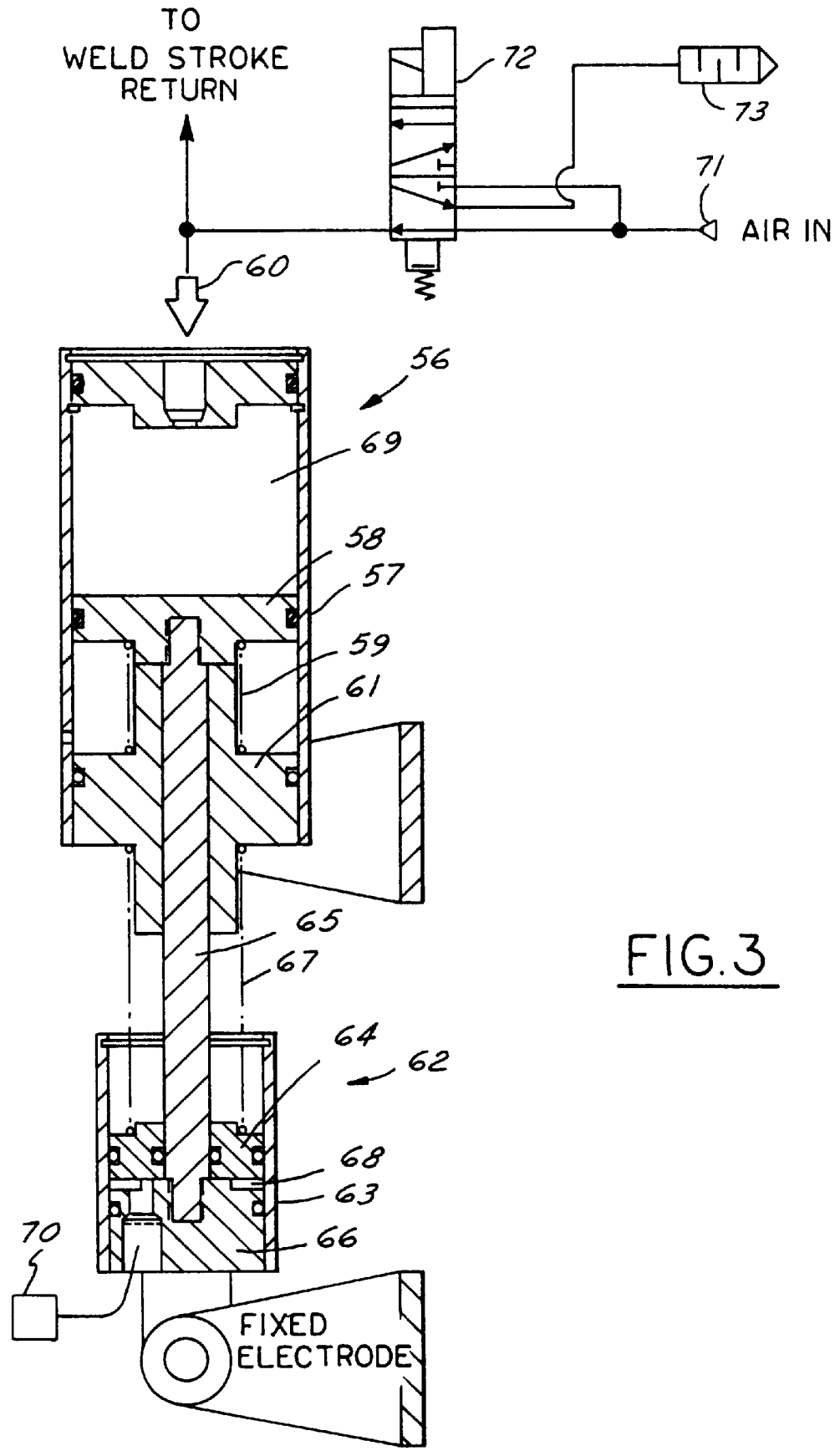
FIGS. 3–5 are enlarged sectional views of the fixing cylinder assembly illustrating different operative conditions.

Using the modulating device of FIG. 2, FIGS. 3–5 illustrate different operative aspects of such modulation. In FIG. 3, no air pressure (as controlled by a control valve 70) is applied to chamber 68 so that the modulating piston 64 remains in contact with the stop 66, causing the piston 64 and secondary cylinder housing to act as one. Spring 67 is the only compensating force acting counter to the primary force of spring 59 when chamber 69 is vented of air pressure. Air pressuring means 60 may comprise an air supply 71, a four-way central valve 72, and an exhaust 73. Air to the weld stroke return affects the positioning of the primary cylinder assembly.

Figure 4:
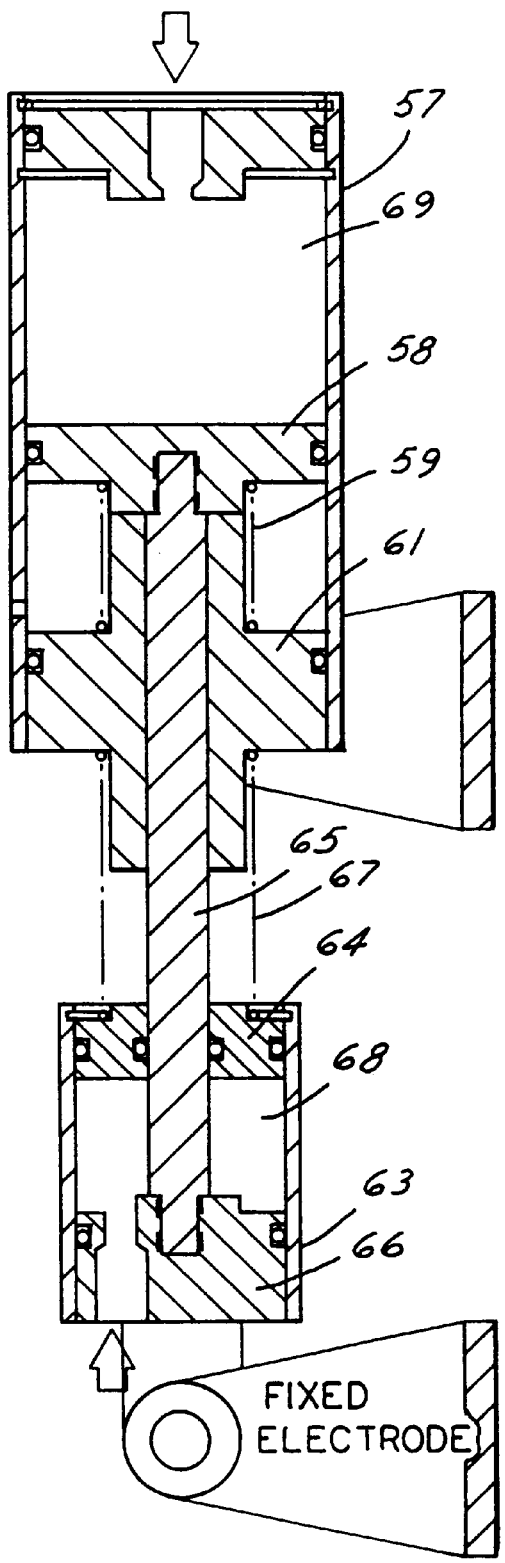

In FIG. 4, air pressure is applied to chamber 68 to adjust the force of the secondary modulating spring 67 that is pushing the stop 66 (at one end of shaft 65) in an opposite direction from which primary spring 59 is pushing the piston 58 (attached to the other end of shaft 65). In the locked condition of FIG. 4, the air pressure in chamber 69 is much greater than the force of spring 59 and thus the piston 58 is shown abuting the necked surface of stop 61 that is integral with housing 57.

Figure 5:
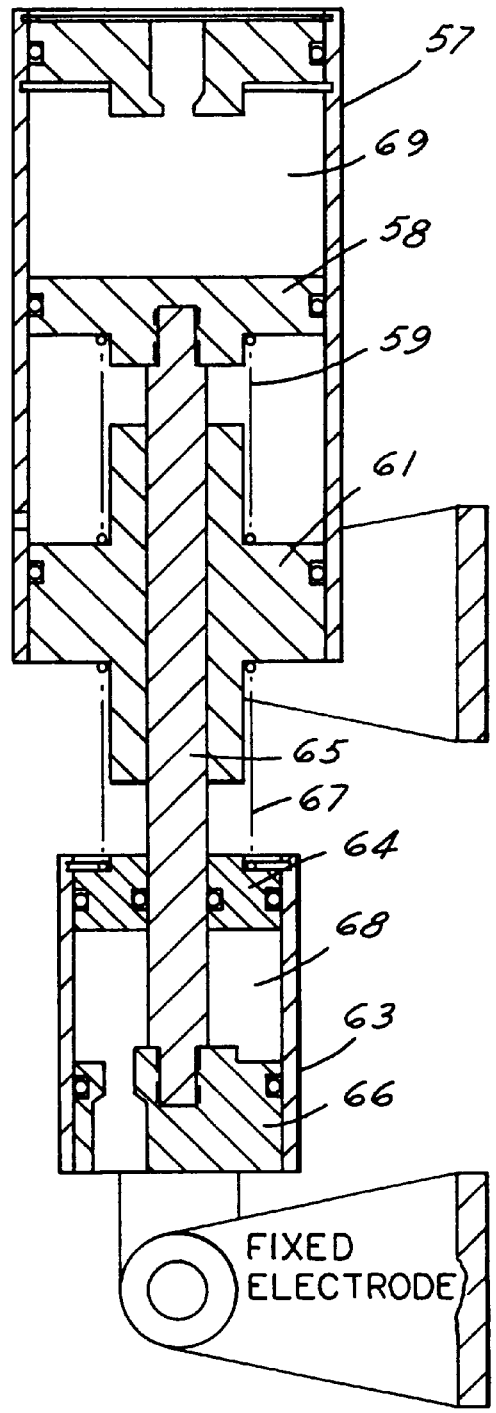

In FIG. 5, the primary chamber 69 is vented and the balance of the spring forces can take effect. Note the movement of piston 58 away from stop 61 as restricted by the counter force of spring 67 which employs the air cushion behind piston 64 to eliminate vibration of the fixed electrode upon such venting. While the invention has been shown and described in its preferred embodiments, it will be clear to those skilled in the art to which it pertains that many changes and modifications may be made thereto without departing from the scope of the invention.

We claim:

1. A spot welding apparatus having a welding gun with movable and fixed electrodes carried on an articulating wrist, the apparatus comprising:

a) a robotically actuated articulating wrist carrying said gun for movement to and from a welding position for a workpiece;

b) a primary cylinder assembly connecting said wrist to the movable electrode of the gun for imposing pressure by such movable electrode to the workpiece and to the fixed electrode during a welding stroke toward the workpiece; and c) a fixing cylinder assembly connecting said wrist to the fixed electrode, the fixing cylinder assembly having
    (i) a fixing cylinder housing having a movable fixing piston therein connected to the fixed electrode of said welding gun and having a fixing piston stop, a primary balancing spring acting between the fixing cylinder housing and the movable fixing piston to carry the weight of said gun,
    (ii) structure means for introducing a fixing air pressure into said fixing cylinder housing chamber to urge the fixing piston to a position locked against said fixing piston stop, and
    (iii) a secondary modulating device acting between the fixed electrode of said gun and said fixing cylinder housing to dampen vibratory movement of said gun upon release of said fixing air pressure for initiation of the welding stroke.

2. The apparatus as in claim 1, in which said secondary modulating device comprises a spring having a predetermined spring force matched to the spring force of said primary balancing spring to thereby effect said modulation.

3. The apparatus as in claim 1, in which said secondary modulating device comprises:

a) a secondary modulating cylinder having a modulating piston slidable therein, a modulating piston stop, and an air chamber normally biasing the modulating piston away from said modulating piston stop, said secondary cylinder housing being connected to said gun to move therewith; and b) a modulating spring acting between the modulating piston and the fixing stop or cylinder housing to urge the modulating piston against the cushion of air that may be contained between the modulating piston housing and the modulating piston to thereby dampen any vibratory movement of the gun upon release of air pressure in said primary cylinder housing chamber.

4. The apparatus as in claim 1, in which said vibratory movement is caused by the counteraction of the gun weight and momentum against the primary spring force occurring upon release of air pressure in the primary cylinder housing.

5. The apparatus as in claim 3, in which the air in said modulating cylinder housing is varied to adjust the net spring force applied to the gun to balance the gun weight.

6. The apparatus as in claim 3, in which said primary spring force is in the range of 0–200 lbs. and said secondary spring force is in the range of 0–100 lbs.

7. The apparatus as in claim 6, in which the primary air pressure is in the range of 60–100 psi and the secondary air pressure is in the range of 40–100 psi.

8. The apparatus as in claim 1, in which upon completion of the welding stroke air pressure is restored to the primary cylinder housing to move the movable electrode away from the workpiece and strip the electrode free from the spot weld.

9. The apparatus as in claim 8, in which said stripping force is in the range of 200–250 lbs. (about 250 pounds).

10. The apparatus as in claim 1, in which said gun is of the pivoting pinch electrode type wherein the welding stroke moving the movable electrode to the workpiece is across a travel distance of about plus or minus 25 mm.

\* \* \* \* \*